US012009001B2

(12) United States Patent
Vasilache et al.

(10) Patent No.: US 12,009,001 B2
(45) Date of Patent: Jun. 11, 2024

(54) DETERMINATION OF SPATIAL AUDIO PARAMETER ENCODING AND ASSOCIATED DECODING

(71) Applicant: Nokia Technologies Oy, Espoo (FI)

(72) Inventors: Adriana Vasilache, Tampere (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 350 days.

(21) Appl. No.: 17/290,053

(22) PCT Filed: Oct. 1, 2019

(86) PCT No.: PCT/FI2019/050704
§ 371 (c)(1),
(2) Date: Apr. 29, 2021

(87) PCT Pub. No.: WO2020/089510
PCT Pub. Date: May 7, 2020

(65) Prior Publication Data
US 2021/0407525 A1 Dec. 30, 2021

(30) Foreign Application Priority Data
Oct. 31, 2018 (GB) ..................................... 1817807
Mar. 21, 2019 (GB) ..................................... 1903850

(51) Int. Cl.
*G10L 19/02* (2013.01)
*G10L 19/008* (2013.01)

(52) U.S. Cl.
CPC ........ *G10L 19/0204* (2013.01); *G10L 19/008* (2013.01)

(58) Field of Classification Search
None
See application file for complete search history.

(56) References Cited

U.S. PATENT DOCUMENTS

2003/0026335 A1 2/2003 Thyagarajan
2007/0094027 A1 4/2007 Vasilache
(Continued)

FOREIGN PATENT DOCUMENTS

CN 1550108 A 11/2004
CN 101292286 A 10/2008
(Continued)

OTHER PUBLICATIONS

Nokia Corporation Addressing open issues for spatial audio (MASA) format. In:Tdoc S4 (18)0789. 3GPP TSG-SA4#99 meeting [online], Date: Jul. 6, 2018, Sections 1-3, table 1 (Year: 2018).*
(Continued)

*Primary Examiner* — Antim G Shah
(74) *Attorney, Agent, or Firm* — Alston & Bird LLP

(57) ABSTRACT

An apparatus comprising means for: receiving values for sub-bands of a frame of an audio signal, the values comprising at least one azimuth value, at least one elevation value at least one energy ratio value and at least one spread and/or surround coherence value for each sub-band; determining a codebook for encoding at least one spread and/or surround coherence value for each sub-band based on the at least one energy ratio value and at least one azimuth value for each sub-band for a frame; discrete cosine transforming at least one vector, the at least one vector comprising the at least one spread and/or surround coherence value for a sub-band for the frame; and encoding a first number of components of the discrete cosine transformed vector based on the determined codebook.

14 Claims, 10 Drawing Sheets

(56) References Cited

U.S. PATENT DOCUMENTS

| | | | | |
|---|---|---|---|---|
| 2013/0170748 | A1* | 7/2013 | Thyagarajan ........ | H04N 19/119 382/166 |
| 2014/0355770 | A1 | 12/2014 | Peters et al. | |
| 2014/0358561 | A1 | 12/2014 | Sen et al. | |
| 2016/0078877 | A1 | 3/2016 | Vasilache et al. | |
| 2019/0356918 | A1 | 11/2019 | Demos et al. | |
| 2021/0020185 | A1 | 1/2021 | Vasilache | |
| 2022/0036906 | A1 | 2/2022 | Vasilache | |

FOREIGN PATENT DOCUMENTS

| | | | |
|---|---|---|---|
| CN | 107221334 | A | 9/2017 |
| CN | 112219237 | A | 1/2021 |
| CN | 113228168 | A | 8/2021 |
| EP | 2360681 | A1 | 8/2011 |
| EP | 2509308 | A1 | 10/2012 |
| EP | 3319087 | A1 | 5/2018 |
| GB | 2578603 | A | 5/2020 |
| JP | 2007-531915 | A | 11/2007 |
| JP | 2008-517339 | A | 5/2008 |
| JP | 2009-510514 | A | 3/2009 |
| WO | 2005/098825 | A1 | 10/2005 |
| WO | 2006/111294 | A1 | 10/2006 |
| WO | 2007/037613 | A1 | 4/2007 |
| WO | 2019/086757 | A1 | 5/2019 |
| WO | 2020/008105 | A1 | 1/2020 |
| WO | 2020/070377 | A1 | 4/2020 |

OTHER PUBLICATIONS

Office Action received for corresponding Indian Patent Application No. 202147022814, dated Feb. 23, 2022, 7 Pages.

Office action received for corresponding Japanese Patent Application No. 2021-547951, dated Jun. 30, 2022, 5 pages of office action and 5 pages of translation available.

Office Action received for corresponding European Patent Application No. 19878287.2, dated Dec. 14, 2022, 4 Pages.

Office action received for corresponding Korean Patent Application No. 2021-7016353, dated Apr. 5, 2023, 5 pages of office action and 4 pages of translation available.

"On spatial metadata for IVAS spatial audio input format", 3GPP TSG-SA4#98 meeting, S4-180462, Agenda: 7.5, Nokia Corporation, Apr. 9-13, 2018, pp. 1-7.

"Low-complexity, full-band audio coding for high-quality, conversational applications", Series G: Transmission Systems and Media, Digital Systems And Networks, Recommendation ITU-T G.719, Jun. 2008, 58 pages.

Extended European Search Report received for corresponding European Patent Application No. 19878287.2, dated Jul. 13, 2022, 5 pages.

Faller, "Parametric Multichannel Audio Coding: Synthesis Of Coherence Cues", IEEE Transactions on Audio, Speech, and Language Processing, vol. 14, No. 1, Jan. 2006, pp. 299-310.

Search Report received for corresponding United Kingdom Patent Application No. 1817807.9, dated Apr. 25, 2019, 5 pages.

Cheng et al., "Psychoacoustic-based Quantisation of Spatial Audio Cues", Electronics Letters, vol. 44, No. 18, Aug. 2008, 3 pages.

International Search Report and Written Opinion received for corresponding Patent Cooperation Treaty Application No. PCT/FI2019/050704, dated Feb. 3, 2020, 17 pages.

"Addressing Open Issues for Spatial Audio (MASA) Format", 3GPP TSG-SA4#99 meeting, Tdoc S4 (18)0789, Agenda : 7.5, Nokia Corporation, Jul. 9-13, 2018, pp. 1-5.

Jeong et al., "Adaptive Huffman Coding of 2-D DCT Coefficients for Image Sequence Compression", Signal Processing: Image Communication, vol. 7, No. 1, Mar. 1995, pp. 1-11.

Memon, "Adaptive Coding of DCT Coefficients by Golomb-Rice codes", Proceedings 1998 International Conference on Image Processing. ICIP98 (Cat. No. 98CB36269), Oct. 1998, pp. 516-520.

Sugiura et al., "Golomb-Rice Coding Optimized via LPC for Frequency Domain Audio Coder", IEEE Global Conference on Signal and Information Processing (GlobalSIP), Dec. 3-5, 2014, pp. 1024-1028.

Hearing Notice for Indian Application No. 202147022814 dated Feb. 5, 2024, 3 pages.

Office Action for Chinese Application No. 201980072488.X dated Mar. 23, 2024, 11 pages.

* cited by examiner

DETERMINATION OF SPATIAL AUDIO PARAMETER ENCODING AND ASSOCIATED DECODING

RELATED APPLICATION

This application claims priority to PCT Application No. PCT/FI2019/050704, filed on Oct. 1, 2019, which claims priority to Great Britain Application No. 1903850.4, filed on Mar. 21, 2019 and Great Britain Application No. 1817807.9, filed on Oct. 31, 2018, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as coherence, spread coherence, number of directions, distance etc) for an audio codec. For example, these parameters can be estimated from microphone-array captured audio signals, and for example a stereo signal can be generated from the microphone array signals to be conveyed with the spatial metadata. The stereo signal could be encoded, for example, with an AAC encoder. A decoder can decode the audio signals into PCM signals, and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However with respect to the components of the metadata compression is a current research topic.

SUMMARY

There is provided according to a first aspect an apparatus comprising means for: receiving values for sub-bands of a frame of an audio signal, the values comprising at least one azimuth value, at least one elevation value at least one energy ratio value and at least one spread and/or surround coherence value for each sub-band; determining a codebook for encoding at least one spread and/or surround coherence value for each sub-band based on the at least one energy ratio value and at least one azimuth value for each sub-band for a frame; discrete cosine transforming at least one vector, the at least one vector comprising the at least one spread and/or surround coherence value for a sub-band for the frame; and encoding a first number of components of the discrete cosine transformed vector based on the determined codebook.

The means for determining a codebook for encoding at least one coherence value for each sub-band based on the at least one energy ratio value and at least one azimuth value for each sub-band for a frame may be further for: obtaining an index representing a weighted average of the at least one energy ratio value for each sub-band for the frame; determining whether a measure of the distribution of the at least one azimuth value for the sub-band for a frame is more than or equal to a determined threshold value; and selecting the codebook based on the index and the determining whether a measure of the distribution of the at least one azimuth value for the sub-band for a frame is more than or equal to a determined threshold value.

The means for selecting the codebook based on the index and the determining whether a measure of the distribution of the at least one azimuth index for a sub-band for a frame is more than or equal to a determined threshold value may be further for selecting a number of codewords for a codebook based on the index.

The measure of the distribution may be one of: an average absolute difference between consecutive azimuth values; an average absolute difference with respect to average azimuth value in sub-band; a standard deviation of the at least one azimuth value for the sub-band for the frame; and a variance of the at least one azimuth value for the sub-band for the frame.

The means for encoding a first number of components of the discrete cosine transformed vector based on the determined codebook may be further for: determining the first number of the discrete cosine transformed vector is dependent on the sub-band; encoding a first component of the first number of the discrete cosine transformed vector components based on the codebook.

The means for encoding a first number of components of the discrete cosine transformed vector based on the determined codebook may be further for: determining a codebook for scalar quantizing based on an index of a sub-band, each codebook comprising a determined number of codewords; generating at least one further index for the remainder of the components of the first number of the discrete cosine transformed vector components based on the determined codebook; generating a mean removed index based on the at least one further index for the remainder of the components of the first number of the discrete cosine transformed vector components; and entropy encoding the mean removed index.

The means for encoding a first number of components of the discrete cosine transformed vector based on the determined codebook may be further for: determining at least one further index for the remainder of the components of the first number of the discrete cosine transformed vector components based on a codebook with a defined number of codewords, the codebook being further based on a sub-band index of the vector; determining a mean removed index based on the at least one further index for the remainder of the components of the first number of the discrete cosine transformed vector components; and entropy encoding the mean removed index.

The means for entropy encoding the mean removed index may be further for Golomb-Rice encoding the mean removed index.

The means for may be further for: storing and/or transmitting the encoded first number of components of the discrete cosine transformed vector.

The means may be further for scalar quantizing the at least one energy ratio value, to generate at least one energy ratio value index suitable for determining the codebook for encoding at least one coherence value for each sub-band.

The means may be further for: estimating a number of bits remaining for encoding the at least one azimuth value and at least one elevation value based on a target number of bits, an estimate of a number of bits for encoding a first number of components of the discrete cosine transformed vector based on the determined codebook before the encoding, a number of bits representing the at least one energy ratio value index, and a number of bits representing the entropy encoding of the mean removed index; encoding the at least one azimuth value and at least one elevation value to generate at least one azimuth value index and at least one elevation value index based on the number of bits remaining, wherein the determining the codebook for encoding at least one coherence value for each sub-band is based on the at least one azimuth value index.

According to a second aspect there is provided an apparatus comprising means for: obtaining encoded values for sub-bands of a frame of an audio signal, the values comprising at least one azimuth index, at least one elevation index at least one energy ratio index and at least one spread and/or surround coherence index for each sub-band; determining a codebook for decoding the at least one spread and/or surround coherence index for each sub-band based on the at least one energy ratio index and at least one azimuth index; inverse discrete cosine transforming the at least one spread and/or surround coherence index to generate at least one vector, the at least one vector comprising the at least one spread and/or surround coherence value for a sub-band for the frame; and parsing the vector to generate at least one spread and/or surround coherence value for each sub-band.

The means for determining a codebook for decoding the at least one spread and/or surround coherence index for each sub-band based on the at least one energy ratio index and at least one azimuth index may be further for: determining whether a measure of the distribution of the at least one azimuth index for a sub-band for a frame is more than or equal to a determined threshold value; and selecting the codebook based on the at least one energy ratio index and the determining whether a measure of the distribution of the at least one azimuth value for the sub-band for a frame is more than or equal to a determined threshold value.

The means for selecting the codebook based on the at least one energy ratio index and the determining whether a measure of the distribution of the at least one azimuth index for a sub-band for a frame is more than or equal to a determined threshold value may be further for selecting a number of codewords for the codebook based on the at least one energy ratio index.

The measure of the distribution may be one of: an average absolute difference between consecutive azimuth values; an average absolute difference with respect to average azimuth value in subband; a variance of the at least one azimuth value for the sub-band for the frame; and a variance of the at least one azimuth value for the sub-band for the frame.

The means for decoding a first number of components of the discrete cosine transformed vector based on the determined codebook may be further for: decoding a first component of the first number of the discrete cosine transformed vector components based on the codebook; decoding further components of the first number of the discrete cosine transformed vector components based on the codebook; and inverse cosine transforming the decoded first component and further components.

According to a third aspect there is provided a method comprising: receiving values for sub-bands of a frame of an audio signal, the values comprising at least one azimuth value, at least one elevation value at least one energy ratio value and at least one spread and/or surround coherence value for each sub-band; determining a codebook for encoding at least one spread and/or surround coherence value for each sub-band based on the at least one energy ratio value and at least one azimuth value for each sub-band for a frame; discrete cosine transforming at least one vector, the at least one vector comprising the at least one spread and/or surround coherence value for a sub-band for the frame; and encoding a first number of components of the discrete cosine transformed vector based on the determined codebook.

Determining a codebook for encoding at least one coherence value for each sub-band based on the at least one energy ratio value and at least one azimuth value for each sub-band for a frame may further comprise: obtaining an index representing a weighted average of the at least one energy ratio value for each sub-band for the frame; determining whether a measure of the distribution of the at least one azimuth value for the sub-band for a frame is more than or equal to a determined threshold value; and selecting the codebook based on the index and the determining whether a measure of the distribution of the at least one azimuth value for the sub-band for a frame is more than or equal to a determined threshold value.

Selecting the codebook based on the index and the determining whether a measure of the distribution of the at least one azimuth index for a sub-band for a frame is more than or equal to a determined threshold value may further comprise selecting a number of codewords for a codebook based on the index.

The measure of the distribution may be one of: an average absolute difference between consecutive azimuth values; an average absolute difference with respect to average azimuth value in sub-band; a standard deviation of the at least one azimuth value for the sub-band for the frame; and a variance of the at least one azimuth value for the sub-band for the frame.

Encoding a first number of components of the discrete cosine transformed vector based on the determined codebook may further comprise: determining the first number of the discrete cosine transformed vector is dependent on the sub-band; encoding a first component of the first number of the discrete cosine transformed vector components based on the codebook.

Encoding a first number of components of the discrete cosine transformed vector based on the determined codebook may further comprise: determining a codebook for scalar quantizing based on an index of a sub-band, each codebook comprising a determined number of codewords; generating at least one further index for the remainder of the components of the first number of the discrete cosine transformed vector components based on the determined codebook; generating a mean removed index based on the at least one further index for the remainder of the components of the first number of the discrete cosine transformed vector components; and entropy encoding the mean removed index.

Encoding a first number of components of the discrete cosine transformed vector based on the determined codebook may further comprise: determining at least one further index for the remainder of the components of the first number of the discrete cosine transformed vector components based on a codebook with a defined number of codewords, the codebook being further based on a sub-band index of the vector; determining a mean removed index based on the at least one further index for the remainder of the components of the first number of the discrete cosine transformed vector components; and entropy encoding the mean removed index.

Entropy encoding the mean removed index may further comprise Golomb-Rice encoding the mean removed index.

The method may further comprise: storing and/or transmitting the encoded first number of components of the discrete cosine transformed vector.

The method may further comprise scalar quantizing the at least one energy ratio value, to generate at least one energy ratio value index suitable for determining the codebook for encoding at least one coherence value for each sub-band.

The method may further comprise: estimating a number of bits remaining for encoding the at least one azimuth value and at least one elevation value based on a target number of bits, an estimate of a number of bits for encoding a first number of components of the discrete cosine transformed vector based on the determined codebook before the encoding, a number of bits representing the at least one energy ratio value index, and a number of bits representing the entropy encoding of the mean removed index; encoding the at least one azimuth value and at least one elevation value to generate at least one azimuth value index and at least one elevation value index based on the number of bits remaining, wherein the determining the codebook for encoding at least one coherence value for each sub-band is based on the at least one azimuth value index.

According to a fourth aspect there is provided a method comprising: obtaining encoded values for sub-bands of a frame of an audio signal, the values comprising at least one azimuth index, at least one elevation index at least one energy ratio index and at least one spread and/or surround coherence index for each sub-band; determining a codebook for decoding the at least one spread and/or surround coherence index for each sub-band based on the at least one energy ratio index and at least one azimuth index; inverse discrete cosine transforming the at least one spread and/or surround coherence index to generate at least one vector, the at least one vector comprising the at least one spread and/or surround coherence value for a sub-band for the frame; and parsing the vector to generate at least one spread and/or surround coherence value for each sub-band.

Determining a codebook for decoding the at least one spread and/or surround coherence index for each sub-band based on the at least one energy ratio index and at least one azimuth index may further comprise: determining whether a measure of the distribution of the at least one azimuth index for a sub-band for a frame is more than or equal to a determined threshold value; and selecting the codebook based on the at least one energy ratio index and the determining whether a measure of the distribution of the at least one azimuth value for the sub-band for a frame is more than or equal to a determined threshold value.

Selecting the codebook based on the at least one energy ratio index and the determining whether a measure of the distribution of the at least one azimuth index for a sub-band for a frame is more than or equal to a determined threshold value may further comprise selecting a number of codewords for the codebook based on the at least one energy ratio index.

The measure of the distribution may be one of: an average absolute difference between consecutive azimuth values; an average absolute difference with respect to average azimuth value in subband; a variance of the at least one azimuth value for the sub-band for the frame; and a variance of the at least one azimuth value for the sub-band for the frame.

Decoding a first number of components of the discrete cosine transformed vector based on the determined codebook may further comprise: decoding a first component of the first number of the discrete cosine transformed vector components based on the codebook; decoding further components of the first number of the discrete cosine transformed vector components based on the codebook; and inverse cosine transforming the decoded first component and further components.

According to a fifth aspect there is provided an apparatus comprising at least one processor and at least one memory including a computer program code, the at least one memory and the computer program code configured to, with the at least one processor, cause the apparatus at least to: receive values for sub-bands of a frame of an audio signal, the values comprising at least one azimuth value, at least one elevation value at least one energy ratio value and at least one spread and/or surround coherence value for each sub-band; determine a codebook for encoding at least one spread and/or surround coherence value for each sub-band based on the at least one energy ratio value and at least one azimuth value for each sub-band for a frame; discrete cosine transform at least one vector, the at least one vector comprising the at least one spread and/or surround coherence value for a sub-band for the frame; and encode a first number of components of the discrete cosine transformed vector based on the determined codebook.

The apparatus caused to determine a codebook for encoding at least one coherence value for each sub-band based on the at least one energy ratio value and at least one azimuth value for each sub-band for a frame may further be caused to: obtain an index representing a weighted average of the at least one energy ratio value for each sub-band for the frame; determine whether a measure of the distribution of the at least one azimuth value for the sub-band for a frame is more than or equal to a determined threshold value; and select the codebook based on the index and the determining whether a measure of the distribution of the at least one azimuth value for the sub-band for a frame is more than or equal to a determined threshold value.

The apparatus caused to select the codebook based on the index and the determining whether a measure of the distribution of the at least one azimuth index for a sub-band for a frame is more than or equal to a determined threshold value may further be caused to select a number of codewords for a codebook based on the index.

The measure of the distribution may be one of: an average absolute difference between consecutive azimuth values; an average absolute difference with respect to average azimuth value in sub-band; a standard deviation of the at least one azimuth value for the sub-band for the frame; and a variance of the at least one azimuth value for the sub-band for the frame.

The apparatus caused to encode a first number of components of the discrete cosine transformed vector based on the determined codebook may further be caused to: determine the first number of the discrete cosine transformed vector is dependent on the sub-band; encode a first component of the first number of the discrete cosine transformed vector components based on the codebook.

The apparatus caused to encode a first number of components of the discrete cosine transformed vector based on the determined codebook may further be caused to: determine a codebook for scalar quantizing based on an index of a sub-band, each codebook comprising a determined number of codewords; generate at least one further index for the remainder of the components of the first number of the discrete cosine transformed vector components based on the determined codebook; generate a mean removed index based on the at least one further index for the remainder of the components of the first number of the discrete cosine transformed vector components; and entropy encode the mean removed index.

The apparatus caused to encode a first number of components of the discrete cosine transformed vector based on the determined codebook may further be caused to: determine at least one further index for the remainder of the components of the first number of the discrete cosine transformed vector components based on a codebook with a defined number of codewords, the codebook being further based on a sub-band index of the vector; determine a mean removed index based on the at least one further index for the remainder of the components of the first number of the discrete cosine transformed vector components; and entropy encode the mean removed index.

The apparatus caused to entropy encode the mean removed index may further be caused to Golomb-Rice encode the mean removed index.

The apparatus may be further caused to: store and/or transmit the encoded first number of components of the discrete cosine transformed vector.

The apparatus may further be caused to scalar quantize the at least one energy ratio value, to generate at least one energy ratio value index suitable for determining the codebook for encoding at least one coherence value for each sub-band.

The apparatus may be further be caused to: estimate a number of bits remaining for encoding the at least one azimuth value and at least one elevation value based on a target number of bits, an estimate of a number of bits for encoding a first number of components of the discrete cosine transformed vector based on the determined codebook before the encoding, a number of bits representing the at least one energy ratio value index, and a number of bits representing the entropy encoding of the mean removed index; encode the at least one azimuth value and at least one elevation value to generate at least one azimuth value index and at least one elevation value index based on the number of bits remaining, wherein the determining the codebook for encoding at least one coherence value for each sub-band is based on the at least one azimuth value index.

According to a sixth aspect there is provided an apparatus comprising at least one processor and at least one memory including a computer program code, the at least one memory and the computer program code configured to, with the at least one processor, cause the apparatus at least to: obtaining encoded values for sub-bands of a frame of an audio signal, the values comprising at least one azimuth index, at least one elevation index at least one energy ratio index and at least one spread and/or surround coherence index for each sub-band; determining a codebook for decoding the at least one spread and/or surround coherence index for each sub-band based on the at least one energy ratio index and at least one azimuth index; inverse discrete cosine transforming the at least one spread and/or surround coherence index to generate at least one vector, the at least one vector comprising the at least one spread and/or surround coherence value for a sub-band for the frame; and parsing the vector to generate at least one spread and/or surround coherence value for each sub-band.

The apparatus caused to determine a codebook for decoding the at least one spread and/or surround coherence index for each sub-band based on the at least one energy ratio index and at least one azimuth index may further be caused to: determine whether a measure of the distribution of the at least one azimuth index for a sub-band for a frame is more than or equal to a determined threshold value; and select the codebook based on the at least one energy ratio index and the determining whether a measure of the distribution of the at least one azimuth value for the sub-band for a frame is more than or equal to a determined threshold value.

The apparatus caused to select the codebook based on the at least one energy ratio index and the determining whether a measure of the distribution of the at least one azimuth index for a sub-band for a frame is more than or equal to a determined threshold value may further be caused to select a number of codewords for the codebook based on the at least one energy ratio index.

The measure of the distribution may be one of: an average absolute difference between consecutive azimuth values; an average absolute difference with respect to average azimuth value in subband; a variance of the at least one azimuth value for the sub-band for the frame; and a variance of the at least one azimuth value for the sub-band for the frame.

The apparatus caused to decode a first number of components of the discrete cosine transformed vector based on the determined codebook may further be caused to: decode a first component of the first number of the discrete cosine transformed vector components based on the codebook; decode further components of the first number of the discrete cosine transformed vector components based on the codebook; and inverse cosine transform the decoded first component and further components.

According to a seventh aspect there is provided an apparatus comprising: means for receiving values for sub-bands of a frame of an audio signal, the values comprising at least one azimuth value, at least one elevation value at least one energy ratio value and at least one spread and/or surround coherence value for each sub-band; means for determining a codebook for encoding at least one spread and/or surround coherence value for each sub-band based on the at least one energy ratio value and at least one azimuth value for each sub-band for a frame; means for discrete cosine transforming at least one vector, the at least one vector comprising the at least one spread and/or surround coherence value for a sub-band for the frame; and means for encoding a first number of components of the discrete cosine transformed vector based on the determined codebook.

According to an eighth aspect there is provided an apparatus comprising means for obtaining encoded values for sub-bands of a frame of an audio signal, the values comprising at least one azimuth index, at least one elevation index at least one energy ratio index and at least one spread and/or surround coherence index for each sub-band; means for determining a codebook for decoding the at least one spread and/or surround coherence index for each sub-band based on the at least one energy ratio index and at least one azimuth index; means for inverse discrete cosine transforming the at least one spread and/or surround coherence index to generate at least one vector, the at least one vector comprising the at least one spread and/or surround coherence value for a sub-band for the frame; and means for parsing the vector to generate at least one spread and/or surround coherence value for each sub-band.

According to a ninth aspect there is provided a computer program comprising instructions [or a computer readable medium comprising program instructions] for causing an apparatus to perform at least the following: receiving values for sub-bands of a frame of an audio signal, the values comprising at least one azimuth value, at least one elevation value at least one energy ratio value and at least one spread and/or surround coherence value for each sub-band; determining a codebook for encoding at least one spread and/or surround coherence value for each sub-band based on the at least one energy ratio value and at least one azimuth value for each sub-band for a frame; discrete cosine transforming at least one vector, the at least one vector comprising the at least one spread and/or surround coherence value for a sub-band for the frame; and encoding a first number of components of the discrete cosine transformed vector based on the determined codebook.

According to a tenth aspect there is provided a computer program comprising instructions [or a computer readable medium comprising program instructions] for causing an apparatus to perform at least the following: obtaining encoded values for sub-bands of a frame of an audio signal, the values comprising at least one azimuth index, at least one elevation index at least one energy ratio index and at least one spread and/or surround coherence index for each sub-band; determining a codebook for decoding the at least one spread and/or surround coherence index for each sub-band based on the at least one energy ratio index and at least one azimuth index; inverse discrete cosine transforming the at least one spread and/or surround coherence index to generate at least one vector, the at least one vector comprising the at least one spread and/or surround coherence value for a sub-band for the frame; and parsing the vector to generate at least one spread and/or surround coherence value for each sub-band.

According to an eleventh aspect there is provided a non-transitory computer readable medium comprising program instructions for causing an apparatus to perform at least the following: receiving values for sub-bands of a frame of an audio signal, the values comprising at least one azimuth value, at least one elevation value at least one energy ratio value and at least one spread and/or surround coherence value for each sub-band; determining a codebook for encoding at least one spread and/or surround coherence value for each sub-band based on the at least one energy ratio value and at least one azimuth value for each sub-band for a frame; discrete cosine transforming at least one vector, the at least one vector comprising the at least one spread and/or surround coherence value for a sub-band for the frame; and encoding a first number of components of the discrete cosine transformed vector based on the determined codebook.

According to a twelfth aspect there is provided a non-transitory computer readable medium comprising program instructions for causing an apparatus to perform at least the following: obtaining encoded values for sub-bands of a frame of an audio signal, the values comprising at least one azimuth index, at least one elevation index at least one energy ratio index and at least one spread and/or surround coherence index for each sub-band; determining a codebook for decoding the at least one spread and/or surround coherence index for each sub-band based on the at least one energy ratio index and at least one azimuth index; inverse discrete cosine transforming the at least one spread and/or surround coherence index to generate at least one vector, the at least one vector comprising the at least one spread and/or surround coherence value for a sub-band for the frame; and parsing the vector to generate at least one spread and/or surround coherence value for each sub-band.

According to a thirteenth aspect there is provided an apparatus comprising: receiving circuitry configured to receive values for sub-bands of a frame of an audio signal, the values comprising at least one azimuth value, at least one elevation value at least one energy ratio value and at least one spread and/or surround coherence value for each sub-band; determining circuitry configured to determine a codebook for encoding at least one spread and/or surround coherence value for each sub-band based on the at least one energy ratio value and at least one azimuth value for each sub-band for a frame; transforming circuitry configured to discrete cosine transform at least one vector, the at least one vector comprising the at least one spread and/or surround coherence value for a sub-band for the frame; and encoding circuitry configured to encode a first number of components of the discrete cosine transformed vector based on the determined codebook.

According to a fourteenth aspect there is provided an apparatus comprising: obtaining circuitry configured to obtain encoded values for sub-bands of a frame of an audio signal, the values comprising at least one azimuth index, at least one elevation index at least one energy ratio index and at least one spread and/or surround coherence index for each sub-band; determining circuitry configured to determine a codebook for decoding the at least one spread and/or surround coherence index for each sub-band based on the at least one energy ratio index and at least one azimuth index; transforming circuitry configured to inverse discrete cosine transform the at least one spread and/or surround coherence index to generate at least one vector, the at least one vector comprising the at least one spread and/or surround coherence value for a sub-band for the frame; and parsing circuitry configured to parse the vector to generate at least one spread and/or surround coherence value for each sub-band.

According to a fifteenth aspect there is provided a computer readable medium comprising program instructions for causing an apparatus to perform at least the following: receiving values for sub-bands of a frame of an audio signal, the values comprising at least one azimuth value, at least one elevation value at least one energy ratio value and at least one spread and/or surround coherence value for each sub-band; determining a codebook for encoding at least one spread and/or surround coherence value for each sub-band based on the at least one energy ratio value and at least one azimuth value for each sub-band for a frame; discrete cosine transforming at least one vector, the at least one vector comprising the at least one spread and/or surround coherence value for a sub-band for the frame; and encoding a first number of components of the discrete cosine transformed vector based on the determined codebook.

According to a sixteenth aspect there is provided a computer readable medium comprising program instructions for causing an apparatus to perform at least the following: obtaining encoded values for sub-bands of a frame of an audio signal, the values comprising at least one azimuth index, at least one elevation index at least one energy ratio index and at least one spread and/or surround coherence index for each sub-band; determining a codebook for decoding the at least one spread and/or surround coherence index for each sub-band based on the at least one energy ratio index and at least one azimuth index; inverse discrete cosine transforming the at least one spread and/or surround coherence index to generate at least one vector, the at least one vector comprising the at least one spread and/or surround coherence value for a sub-band for the frame; and parsing the vector to generate at least one spread and/or surround coherence value for each sub-band.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore the output of the example system is a multi-channel loudspeaker arrangement. However it is understood that the output may be rendered to the user via means other than loudspeakers. Furthermore the multi-channel loudspeaker signals may be generalised to be two or more playback audio signals.

The metadata consists at least of direction (elevation, azimuth), energy ratio of a resulting direction, and spread coherence components of a resulting direction, for each considered time-frequency block (time/frequency subband). In addition, independent of the direction, the surround coherence may be determined and included for each time-frequency block. All this data is encoded and transmitted (or stored) by the encoder in order to be able to reconstruct the spatial signal at the decoder.

Typical overall operating bitrates of the codec leave 3.0 kbps, 4.0 kbps, 8 kbps or 10 kbps for the transmission/storage of metadata. The encoding of the direction parameters and energy ratio components have been examined before, but encoding the coherence data has not been explored and at lower bitrates is removed and not transmitted or stored.

The concept as discussed hereafter is to encode the coherence parameters along with the direction and energy ratio parameters for each time-frequency block. In the following examples the encoding is performed in the discrete cosine transform domain, and is dependent on the current sub-band index, and the current energy ratio and azimuth values. The DCT transform has been chosen in the following embodiments as it is optimized for low complexity implementations, however other time-frequency domain transforms may be applied and used instead.

In some embodiments a fixed bitrate coding approach may be combined with variable bitrate coding that distributes encoding bits for data to be compressed between different segments, such that the overall bitrate per frame is fixed. Within the time frequency blocks, the bits can be transferred between frequency sub-bands.

Figure 1:
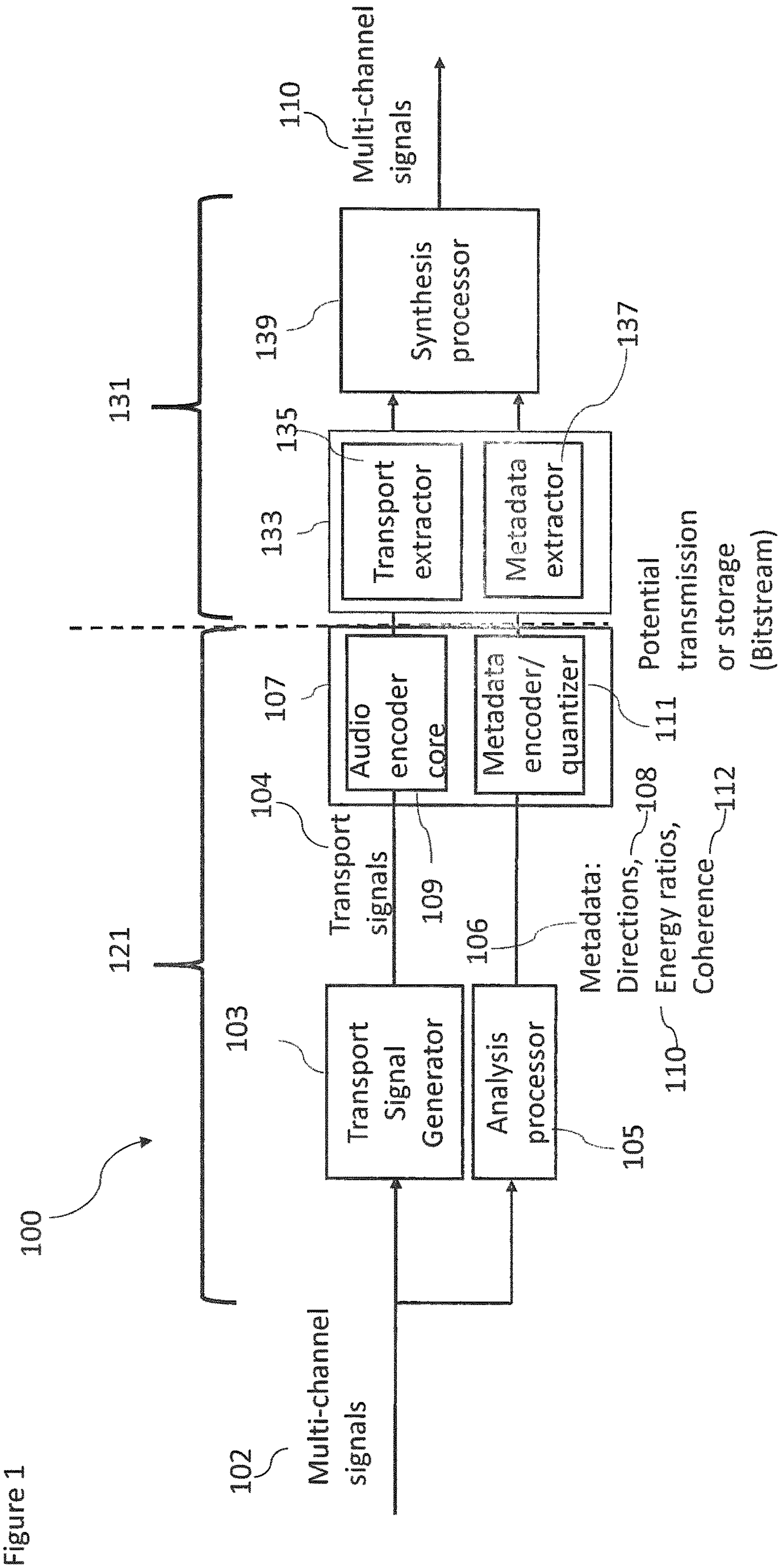
FIG. 1 shows schematically a system of apparatus suitable for implementing some embodiments.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example in some embodiments the spatial analyser and the spatial analysis may be implemented external to the encoder. For example in some embodiments the spatial metadata associated with the audio signals may be a provided to an encoder as a separate bit-stream. In some embodiments the spatial metadata may be provided as a set of spatial (direction) index values.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example the transport signal generator 103 may be configured to generate a 2 audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be spatial audio parameters. In other words the spatial audio parameters comprise parameters which aim to characterize the sound-field created by the multi-channel signals (or two or more playback audio signals in general).

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore in summary first the system (analysis part) is configured to receive multi-channel audio signals.

Then the system (analysis part) is configured to generate a suitable transport audio signal (for example by selecting or downmixing some of the audio signal channels).

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata.

Figure 2:
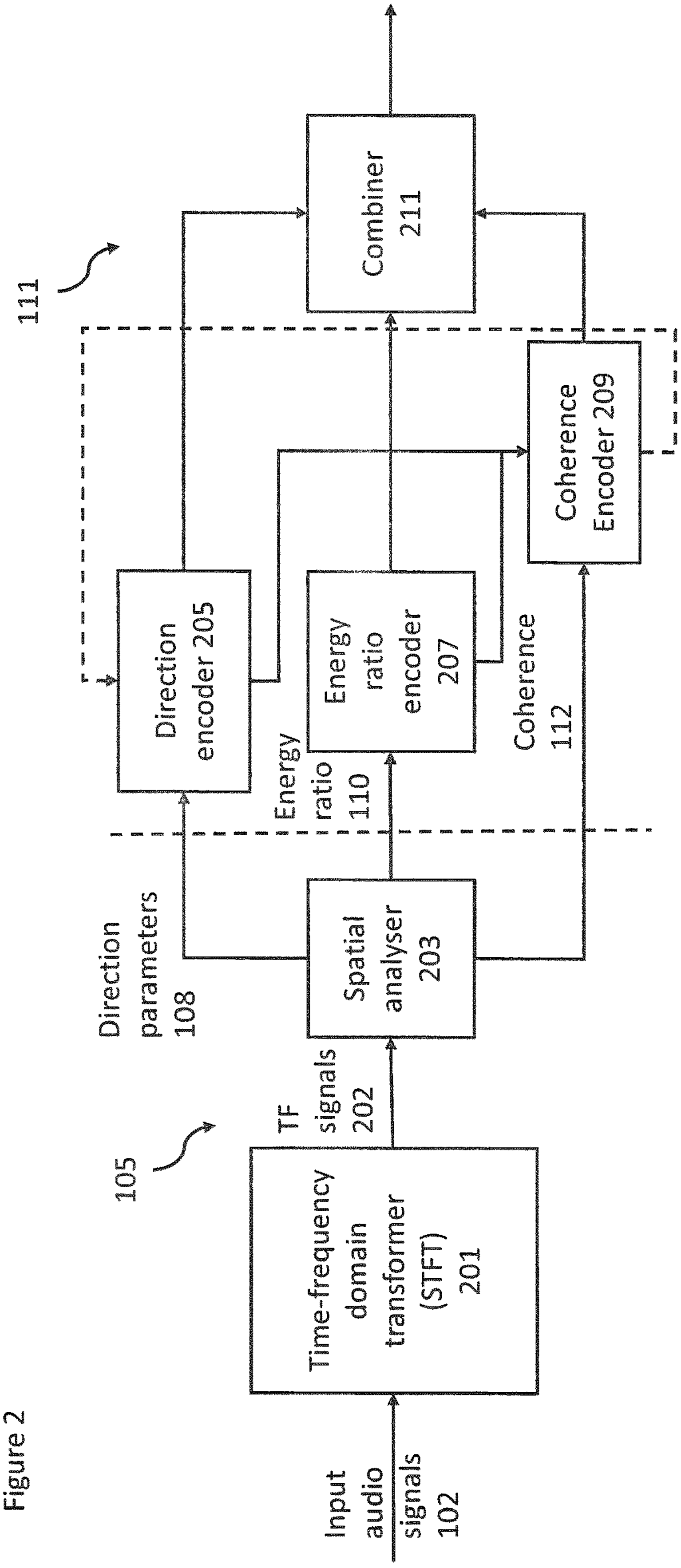
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203 and to a signal analyser 205.

Thus for example the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into subbands that group one or more of the bins into a subband of a band index k=0, . . . , K−1. Each subband k has a lowest bin $b_{k,low}$ and a highest bin $b_{k,high}$, and the subband contains all bins from $b_{k,low}$ to $b_{k,high}$. The widths of the subbands can approximate any suitable distribution. For example the Equivalent rectangular bandwidth (ERB) scale or the Bark scale.

In some embodiments the analysis processor 105 comprises a spatial analyser 203. The spatial analyser 203 may be configured to receive the time-frequency signals 202 and based on these signals estimate direction parameters 108. The direction parameters may be determined based on any audio based 'direction' determination.

For example in some embodiments the spatial analyser 203 is configured to estimate the direction with two or more signal inputs. This represents the simplest configuration to estimate a 'direction', more complex processing may be performed with even more signals.

The spatial analyser 203 may thus be configured to provide at least one azimuth and elevation for each frequency band and temporal time-frequency block within a frame of an audio signal, denoted as azimuth φ(k,n) and elevation θ(k,n). The direction parameters 108 may be also be passed to a direction index generator 205.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. The energy ratio may be passed to an energy ratio encoder 207.

The spatial analyser 203 may furthermore be configured to determine a number of coherence parameters 112 which may include surrounding coherence (γ(k,n)) and spread coherence (ζ(k,n)), both analysed in time-frequency domain. A spread coherence parameter may have values from 0 to 1. A spread coherence value of 0 denotes a point source, in other words, when reproducing the audio signal using a multi-loudspeaker system the sound should be reproduced with as few loudspeakers as possible (for example only a centre loudspeaker when the direction is central). As the value of the spread coherence increases, more energy is spread to the other loudspeakers around the centre loudspeaker until at the value 0.5, the energy is evenly spread among the centre and neighbouring loudspeakers. As the value of spread coherence increases over 0.5, the energy in the centre loudspeaker is decreased until at the value 1, there is no energy in the centre loudspeaker, and all the energy is in neighbouring loudspeakers. The surrounding coherence parameter has values from 0 to 1. A value of 1 means that there is coherence between all (or nearly all) loudspeaker channels. A value of 0 means that there is no coherence between all (or even nearly all) loudspeaker channels. This is further explained in GB application No 1718341.9 and PCT application PCT/F12018/050788.

Therefore in summary the analysis processor is configured to receive time domain multichannel or other format such as microphone or ambisonic audio signals.

Following this the analysis processor may apply a time domain to frequency domain transform (e.g. STFT) to generate suitable time-frequency domain signals for analysis and then apply direction analysis to determine direction and energy ratio parameters.

The analysis processor may then be configured to output the determined parameters.

Although directions, energy ratios, and coherence parameters are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

In some embodiments the directional data may be represented using 16 bits such that the each azimuth parameter is approximately represented on 9 bits, and the elevation on 7 bits. In such embodiments the energy ratio parameter may be represented on 8 bits. For each frame there may be N=5 subbands and M=4 time frequency (TF) blocks. Thus in this example there are (16+8)×M×N bits needed to store the uncompressed direction and energy ratio metadata for each frame. The coherence data for each TF block may be a floating point representation between 0 and 1 and may be originally represented on 8 bits.

As also shown in FIG. 2 an example metadata encoder/quantizer 111 is shown according to some embodiments.

The metadata encoder/quantizer 111 may comprise a direction encoder 205. The direction encoder 205 is configured to receive the direction parameters (such as the azimuth φ(k,n) and elevation θ(k,n) 108 (and in some embodiments an expected bit allocation) and from this generate a suitable encoded output. In some embodiments the encoding is based on an arrangement of spheres forming a spherical grid arranged in rings on a 'surface' sphere which are defined by a look up table defined by the determined quantization resolution. In other words the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

Furthermore in some embodiments the direction encoder 205 is configured to determine a variance of the azimuth parameter value and pass this to the coherence encoder 209.

The encoded direction parameters may then be passed to the combiner 211.

The metadata encoder/quantizer 111 may comprise an energy ratio encoder 207. The energy ratio encoder 207 is configured to receive the energy ratios and determine a suitable encoding for compressing the energy ratios for the sub-bands and the time-frequency blocks. For example in some embodiments the energy ratio encoder 207 is configured to use 3 bits to encode each energy ratio parameter value.

Furthermore in some embodiments rather than transmitting or storing all energy ratio values for all TF blocks, only one weighted average value per sub-band is transmitted or stored. The average may be determined by taking into account the total energy of each time block, favouring thus the values of the sub-bands having more energy.

In such embodiments the quantized energy ratio value is the same for all the TF blocks of a given sub-band.

In some embodiments the energy ratio encoder 207 is further configured to pass the quantized (encoded) energy ratio value to the combiner 211 and to the coherence encoder 209.

The metadata encoder/quantizer 111 may comprise a coherence encoder 209. The coherence encoder 209 is configured to receive the coherence values and determine a suitable encoding for compressing the coherence values for the sub-bands and the time-frequency blocks. A 3-bit precision value for the coherence parameter values has been shown to produce acceptable audio synthesis results but even then this would require a total of 3×20 bits for the coherence data for all TF blocks (in the example 8 sub-band and 5 TF block per frame).

As described hereafter in some embodiments the encoding is implemented in the DCT domain, and may be dependent on the current sub-band index, and the current energy ratio and azimuth values.

The encoded coherence parameter values may then be passed to the combiner 211.

The metadata encoder/quantizer 111 may comprise a combiner 211. The combiner is configured to receive the encoded (or quantized/compressed) directional parameters, energy ratio parameters and coherence parameters and combine these to generate a suitable output (for example a metadata bit stream which may be combined with the transport signal or be separately transmitted or stored from the transport signal).

Figure 3:
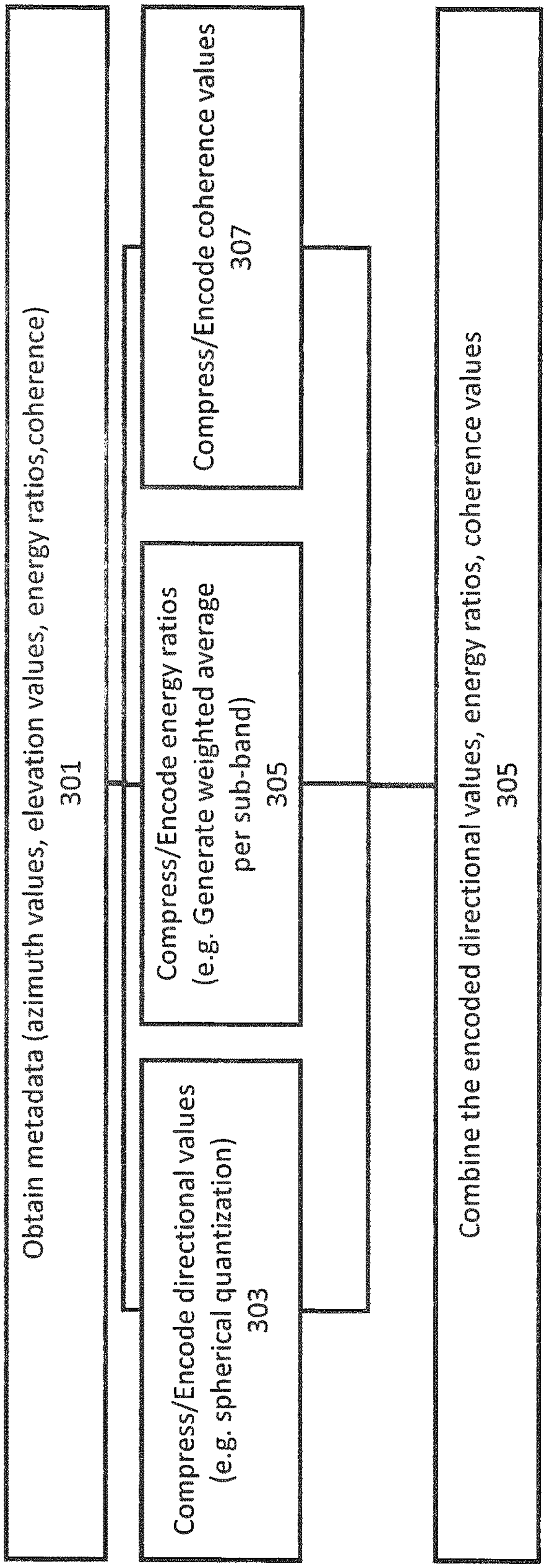
FIG. 3 shows a flow diagram of the operation of the metadata encoder as shown in FIG. 2 according to some embodiments.

With respect to FIG. 3 is shown an example operation of the metadata encoder/quantizer as shown in FIG. 2 according to some embodiments.

The initial operation is obtaining the metadata (such as azimuth values, elevation values, energy ratios, coherence etc) as shown in FIG. 3 by step 301.

The directional values (elevation, azimuth) may then be compressed or encoded (for example by applying a spherical quantization, or any suitable compression) as shown in FIG. 3 by step 303.

The energy ratio values are compressed or encoded (for example by generating a weighted average per sub-band and then quantizing these as a 3 bit value) as shown in FIG. 3 by step 305.

The coherence values are also compressed or encoded (for example by encoding in the DCT domain as indicated hereafter) as shown in FIG. 3 by step 307.

The encoded directional values, energy ratios, coherence values are then combined to generate the encoded metadata as shown in FIG. 3 by step 305.

Figure 4:
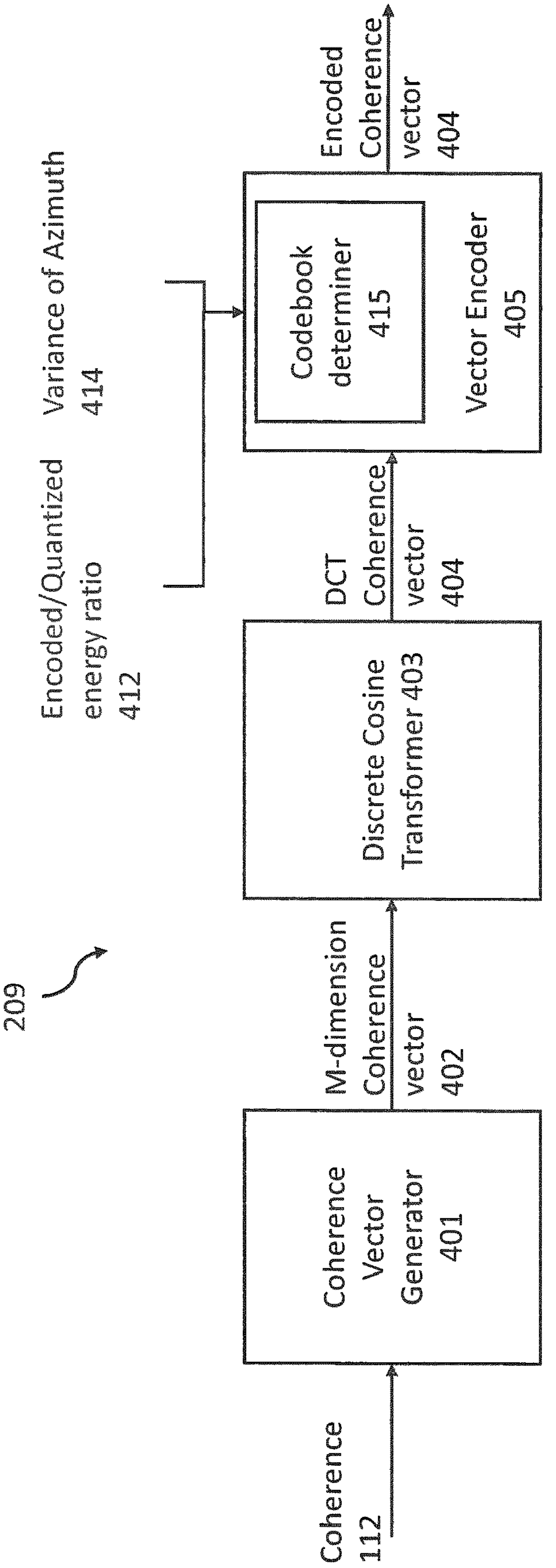
FIG. 4 shows schematically the coherence encoder as shown in FIG. 2 according to some embodiments.

With respect to FIG. 4 is shown an example coherence encoder 209 as shown in FIG. 2.

In some embodiments the coherence encoder 209 comprises a coherence vector generator 401. The coherence vector generator 401 is configured to receive the coherence values 112, which may be 8 bit floating point representations between 0 and 1.

The coherence vector generator 401 is configured for each sub-band to generate a vector of coherence values. Thus in the example where there are M time-frequency blocks then the coherence vector generator 401 is configured to generate an M dimensional vector of coherence data 402.

The coherence data vector 402 is output to the discrete cosine transformer 403.

In some embodiments the coherence encoder 209 comprises the discrete cosine transformer. The discrete cosine transformer may be configured to receive the M dimensional coherence data vector 402 and discrete cosine transform (DCT) the vector.

Any suitable method for performing a DCT may be implemented. For example in some embodiments where the vector comprises a 4 dimensional vector of coherences corresponding to a sub-band. Then the vector $x=(x_1, x_2, x_3, x_4)'$ the matrix multiplication with the DCT matrix of order 4 is equivalent to:

$$y = DCT(x) = \begin{bmatrix} 0.5(a+b) \\ 0.6533c + 0.2706d \\ 0.5(a-b) \\ 0.2706c - 0.6533d \end{bmatrix}$$

where $$a=x_1+x_2$$

$$b=x_2+x_3$$

$$c=x_1-x_4$$

$$d=x_2-x_3$$

This reduces the number of operations for the DCT transform from 28 to 14.

The DCT coherence vector 404 may then be output to the vector encoder 405.

In some embodiments the coherence encoder 209 comprises a vector encoder 405. The vector encoder 405 is configured to receive the DCT coherence vector 404 and encode it by using a suitable codebook.

In some embodiments the vector encoder 405 comprises a codebook determiner 415. The codebook determiner is configured to receive the encoded/quantized energy ratio 412 and the variance of the quantized azimuth 414 (which may be determined from the energy ratio encoder and the direction encoder as shown in FIG. 2) and determine a suitable codebook to apply to the DCT coherence vector values.

In some embodiments the encoding of the first DCT parameter is implemented in manner different than the encoding of further DCT parameters. This is because the first and further DCT parameters have significantly different distributions. Furthermore the distribution of the first DCT parameter is also dependent on two factors: the energy ratio value for the current subband and the variance of the azimuth within the current subband.

In some embodiments (and as discussed previously) 3 bits are used to encode each energy ratio value and only one weighted average value per subband is generated and transmitted (and/or stored). This means that the quantized energy ratio value is the same for all the TF blocks of a given subband.

Furthermore the variance of the azimuth influences the distribution of the first DCT parameter based on whether the variance of the quantized azimuth within the subband is very small (under a determined threshold) or larger than the threshold.

In some embodiments furthermore a number of sub-bands are selected I_N. For example in some embodiments I_N=3. In such embodiments the sub-bands upto the selected sub-band limit are encoded using a first number of secondary DCT parameters and the remaining sub-bands encoded using a second number of secondary DCT parameters. The first number in some embodiments is 1 and the second number is 2. In other words in some embodiments the vector encoder is configured such that the sub-bands<=I_N encode the first 2 components of the DCT transformed vector (one primary and one secondary) and the sub-bands>I_N encode the first 3 components of the DCT transformed vector (one primary and two secondary). These two additional components can be encoded with a 2 dimensional vector quantizer or, they could be added as extra dimensions to the N-dimensional vector quantizer of the second DCT parameters and use an N+2 dimensional vector quantizer for the encoding of all secondary parameters at once.

Figure 6:
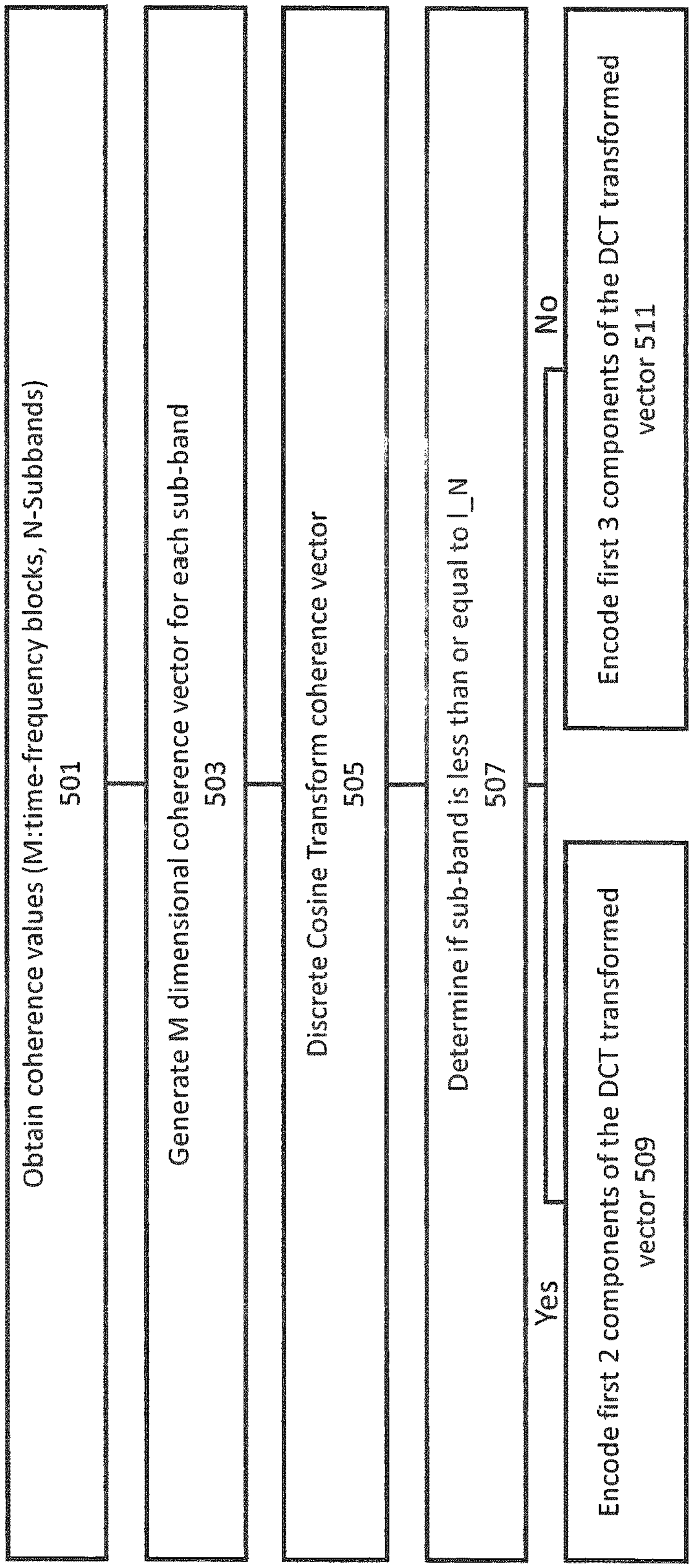
FIG. 6 shows a flow diagram of the operation of the coherence encoder encoding the first and further coherence components according to some embodiments.

The overview of the encoding of the coherence parameter is shown in a flow diagram, FIG. 6.

The first operation is obtaining the coherence parameter values as shown in FIG. 6 by step 501.

Having obtained the coherence parameter values for the frame the next operation is to generate M dimensional coherence vectors for each sub-band as shown in FIG. 6 by step 503.

The M dimensional coherence vectors are then transformed, for example using a discrete cosine transform (DCT), as shown in FIG. 6 by step 505.

Then the DCT representations are sorted into sub-bands below the determined sub-band selection value and above the value as shown in FIG. 6 step 507. In other words determining whether a current sub-band being processed is less than or equal to I_N or more than I_N.

The DCT representations for M dimensional coherence vectors for sub-bands less than or equal to I_N are then encoded by encoding the first 2 components of the DCT transformed vector as shown in FIG. 6 step 509.

The DCT representations for M dimensional coherence vectors for sub-bands more than I_N are then encoded by encoding the first 3 components of the DCT transformed vector as shown in FIG. 6 step 511.

This for example may be summarised as the following pseudocode form. For each subband i=1:N

```
    The M dimensional vector of coherence data is DCT transformed
    If i <= I_N
        Encode the first 2 components of the DCT transformed vector
    Else
        Encode the first 3 components of the DCT transformed vector
    End if
End for
```

Figure 5:
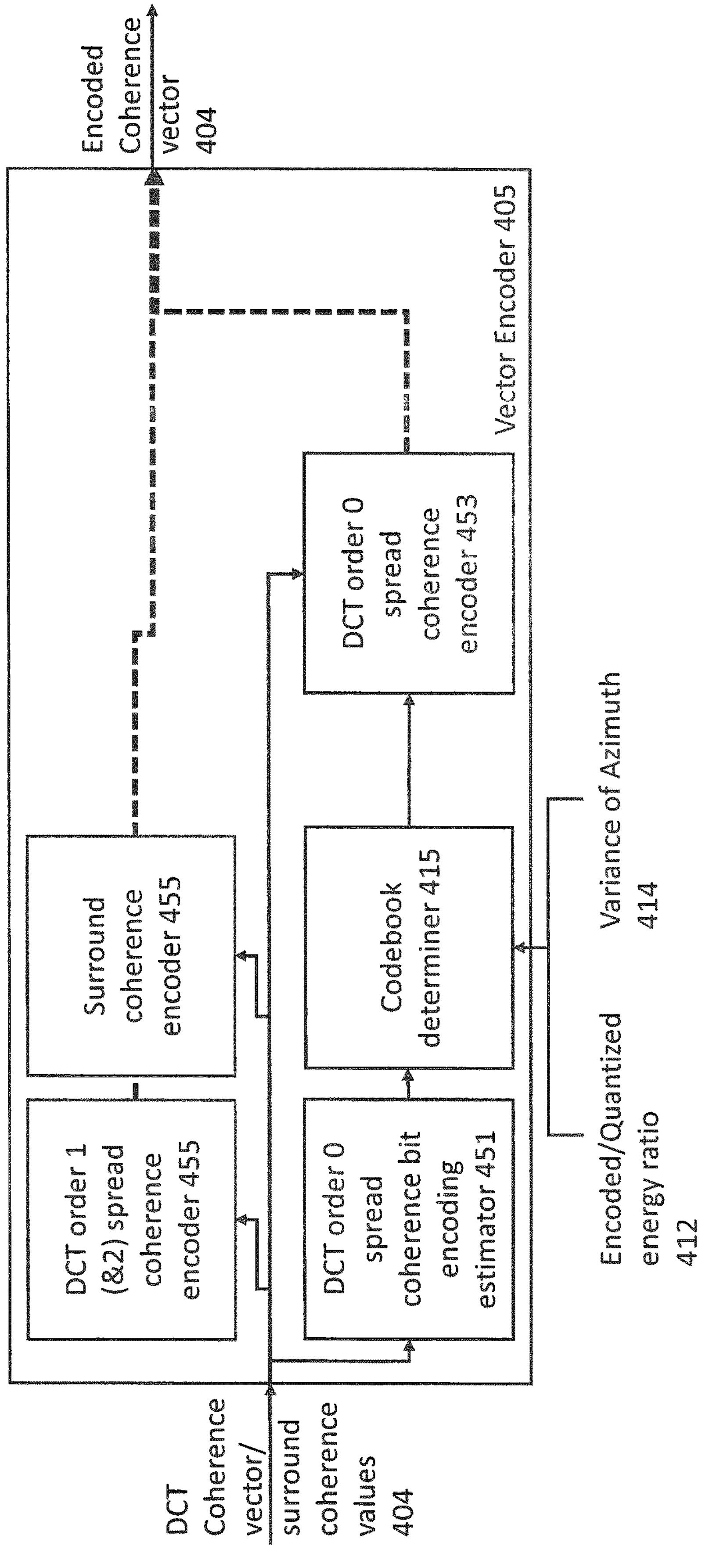
FIG. 5 shows a flow diagram of the operation of the coherence encoder as shown in FIG. 4 according to some embodiments.

With respect to FIG. 5 is shown in further detail the vector encoder 405 according to some embodiments the vector encoder 405 is shown receiving the DCT coherence vector 404 as an input.

The vector encoder in some embodiments comprises a DCT order 0 spread coherence bit encoding estimator (or first/primary DCT coherence parameter estimator) 451.

The DCT order 0 spread coherence bit encoding estimator (or first/primary DCT coherence parameter estimator) 451 is configured to receive the DCT coherence vector 404 and from this determine whether all of the coherence values are non-null. When at least one coherence value is non-null the DCT order 0 spread coherence bit encoding estimator is configured to estimate the number of bits for the encoding of the DCT parameter of order 0 for the spread coherence, for a joint encoding: $[\log_2 \Pi_i \text{len\_cb\_dct0}[\text{indexER}_i]]$, where $\text{indexER}_i$ is the index of the quantized energy ratio of the subband i and len_cb_dct0[ ]={7,6,5,4,4,4,3,2}.

This estimation is passed to a codebook determiner 415.

The vector encoder may furthermore in some embodiments comprise a DCT order 1 (&2 onwards) spread coherence encoder (or further/secondary DCT coherence parameter encoder) 455. The DCT order 1 (&2 onwards) spread coherence encoder 455 is configured to receive the DCT coherence vector 404 and from this encode the DCT parameter of order 1 (and 2 onwards for the sub-bands which encode further secondary parameters) for spread coherence, using a Golomb Rice coding for the mean removed indexes of the quantized indexes. The indexes in some embodiments are obtained from scalar quantization in codebooks dependent on the index of the sub-band. The number of codewords is the same for all sub-bands, for example 5 codewords.

The output encoded DCT order 1 (and 2 onwards) encoded spread coherence parameters can be prepared to be output as part of the encoded coherence vector 404.

The vector encoder may furthermore in some embodiments comprise a surround coherence encoder 457. The surround coherence encoder 457 is configured to receive the surround coherence parameters and from this encode the surround coherence parameter and calculate the number of bits for surround coherence. In some embodiments the surround coherence encoder 457 is configured to transmit one surround coherence value per sub-band. In a manner as described with respect to the encoding of the energy ratio, the value may be obtained in some embodiments as a weighted average of the time-frequency blocks of the sub-band, the weights being determined by the signal energies.

In some embodiments the averaged surround coherence values are scalar quantized with codebooks whose length (number of codewords) is dependent on the energy ratio index (2,3,4,5,6,7,8,8 codewords for the indexes: 0,1,2,3,4, 5,6,7). The indexes in some embodiments are encoded using a Golomb Rice encoder on the mean removed values or by joint encoding taking into account the number of codewords used (in other words selecting either entropy coding, such as GR coding, or joint coding based on which one encodes the value as fewer bits).

In some embodiments the total number of bits estimated (for encoding the primary spread coherence) and used (to encode the secondary spread and surround coherence parameters) are determined and from this total the remaining number of bits available for encoding the directional parameters determined. This for example may be mathematically determined as $$ED=B-(EPSC+SSC+SC+EP)$$

Where ED is the remaining number of bits available, B the original bit target, EPSC the estimated number of bits for encoding the primary spread coherence parameters, SSC the number of bits used for encoding the secondary spread coherence parameters, SC the number of bits used for encoding the surround coherence parameters, and EP the number of bits used for encoding the energy ratios.

The remaining number of bits available may be passed to the direction encoder and used to determine the number of bits to be used to encode the direction parameters according to any suitable encoding method (for example as mentioned above).

Furthermore in some embodiments the vector encoder may furthermore comprise a codebook determiner 415 as discussed previously. The codebook determiner 415 in some embodiments is configured to receive the estimate of the number of bits for encoding the DCT order 0 spread coherence parameter and furthermore the encoded/quantized energy ratio 412 and the encoded variance of the azimuth 414. The codebook determiner 415 may from these inputs determine a suitable codebook for the encoding of the DCT order 0 spread coherence parameter. This determination in some embodiments is based on the energy ratio and quantized azimuth value (the variance of the quantized azimuth value for the current sub-band). If the variance of the azimuth for the sub-band is lower than a determined threshold (e.g. the threshold is 30) a first determined codebook is used, otherwise another determined codebook is used. In some embodiments there are a total of 16 codebooks for the DCT coefficient of order 0 (based on there being 8 indexes for energy ratios and 2 possibilities for the azimuth variance in relation to the given threshold).

The selected codebook is passed to a DCT order 0 spread coherence encoder 453.

Furthermore in some embodiments the vector encoder may furthermore comprise a DCT order 0 spread coherence encoder 453. The DCT order 0 spread coherence encoder 453 having received the determined codebook and the DCT coherence vector is configured to use the codebook to encode the DCT order 0 spread coherence and pass this to be output as the encoded coherence vector 404.

Figure 7:
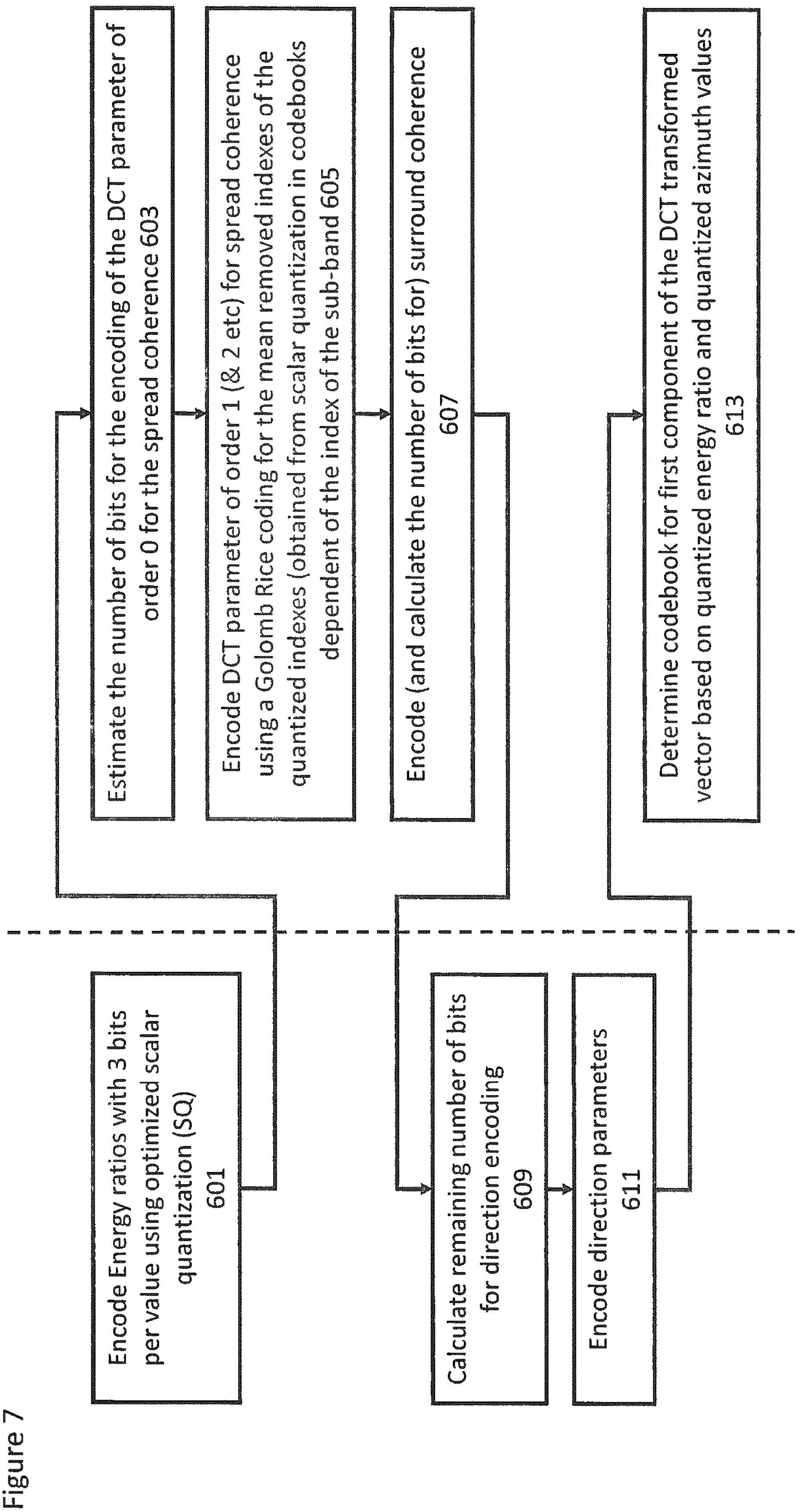
FIG. 7 shows a flow diagram of a further operation of the coherence encoder encoding the first and further coherence components according to some further embodiments.

With respect to FIG. 7 is shown a flow diagram of the method for the encoding of the energy ratio parameters and direction parameters (as shown on the left of the dashed line) and the coherence parameters (on the right of the dashed line) according to some embodiments.

In some embodiments the energy ratios are encoded using 3 bits per value and by using an optimized scalar quantization (SQ) method as shown in FIG. 7 by step 601.

Then if at least one coherence value is non-null then the number of bits for the encoding of the DCT parameter of order 0 for the spread coherence is estimated as shown in FIG. 7 by step 603. Otherwise if the output is all zero then just send one bit to signal that the value is zero.

Furthermore the method may comprise encoding the DCT parameter of order 1 for spread coherence, using a Golomb Rice coding for the mean removed indexes of the quantized indexes as shown in FIG. 7 by step 605. The indexes as discussed above may in some embodiments be obtained from scalar quantization in codebooks dependent on the index of the sub-band. The number of codewords is the same for all sub-bands (for example 5).

Additionally in some embodiments the method further comprises encoding and calculating the number of bits for surround coherence as shown in FIG. 7 by step 607. In some embodiments as discussed above one surround coherence value is transmitted per sub-band. Furthermore in some embodiments the value is obtained, in a manner similar to the method used for the energy ratio as in step 601, as a weighted average of the time-frequency blocks of the sub-band, the weights being the signal energies. The averaged surround coherence values are then scalar quantized with codebooks whose length (number of codewords) is dependent on the energy ratio index (2,3,4,5,6,7,8,8 codewords for the indexes: 0,1,2,3,4,5,6,7). The indexes are encoded by Golomb Rice encoded on the mean removed values or by joint encoding taking into account the number of codewords used.

In some embodiments the method comprises calculating the remaining number of bits for encoding the direction parameters as shown in FIG. 7 by step 609.

Having determined the remaining number of bits for encoding the direction parameters then the direction parameters are encoded as shown in FIG. 7 by step 611.

Furthermore the method comprises encoding the DCT coefficient of order 0 for the spread coherence, using a codebook dependent on the energy ratio and quantized azimuth value (the variance of the quantized azimuth value for the current sub-band) as shown in FIG. 7 by step 613. This determination may be based on selecting one or other of two possible codebooks for an energy ratio value range, the selection being based on the variance of the azimuth for the sub-band being lower (or higher) than a threshold value. In such a manner there may be a total of 16 codebooks for the DCT coefficient of order 0 (8 indexes for energy ratios and 2 possibilities for the azimuth variance in relation to the given threshold).

This operation may be represented in code by the following

```
static short quantize_coherence(IVAS_MASA_QDIRECTION* q_direction,
    unsigned char coding_subbands,
    unsigned char no_directions,
    short all_coherence_zero,
    short max_bits_coherence,
    IVAS_MASA_METADATA_FRAME* metadata,
    short write_flag,
    int * first_pos)
{
    short i, j, k;
    float dct_coh[MASA_MAXIMUM_CODING_SUBBANDS][MASA_SUBFRAMES];
    unsigned short idx_dct[MASA_SUBFRAMES*MASA_MAXIMUM_CODING_SUBBANDS];
    short nbits;
    int no_cb;
    short no_cb_vec[MASA_MAXIMUM_CODING_SUBBANDS];
    short bits_surround_coh;
    if (all_coherence_zero == 1)
    {
        nbits =0;
        return nbits;
    }
    else
    {
        for (i = 0; i < no_directions; i++)
        {
            k = 0;
            no_cb = 1;
            for (j = 0; j < coding_subbands; j++)
            {
                /* DCT transform */
                dct4_transform(q_direction[i].spread_coherence[j],
dct_coh[j]);
                if (write_flag)
                {
                    /* quantize first DCT parameter */
                    dct_coh[j][0] = quantize_DCT_0_coh(dct_coh[j][0], j,
```

-continued

```
coherence_cb0, DELTA_AZI_DCT0, NO_CV_COH, &q_direction[i], &idx_dct[k],
&no_cb_vec[j]);
                    }
                    no_cb *= len_cb_dct0[q_direction->energy_ratio_index[j][0]];
                    idx_dct[k + coding_subbands] = quantize_sq(dct_coh[j][1],
&coherence_cb1[j * NO_CV_COH1], NO_CV_COH1, &dct_coh[j][1]);
                    k++;
                    /* pick second DCT parameter for quantization */
                    /*vec_dct_coh1[j][2] = dct_coh[j][1]*/
                    if (j > 2)
                    {
                        dct_coh[j][2] = 0.0f; /* dct_coh[j][2]; */
                    }
                    else
                    {
                        dct_coh[j][2] = 0.0f;
                    }
                    dct_coh[j][3] = 0.0f;
                }
                if (write_flag)
                {
                    for (j = 0; j < coding_subbands; j++)
                    {
                        /* inverse DCT transform */
                        invdct4_transform(dct_coh[j],
q_direction[i].spread_coherence[j]);
                    }
                }
                /* encode indexes and write bitstream */
                nbits = ceilf(logf((float)no_cb)*INV_LOG_2);
                if (write_flag)
                {
                    nbits = encode_coherence_indexesDCT0(idx_dct,
coding_subbands, no_cb_vec, metadata, *first_pos);
                }
                else
                {
                    *first_pos = metadata->bit_pos;
                    metadata->bit_pos += nbits;
                    nbits +=
encode_coherence_indexesDCT1(&idx_dct[coding_subbands], coding_subbands,
no_cb_vec, metadata);
                }
            }
            if (write_flag == 0)
            {
                bits_surround_coh = max_bits_coherence - nbits;
                if (bits_surround_coh < MIN_BITS_SURR_COH)
                {
                    bits_surround_coh = 0;
                }
                else
                {
                    /* encode surround coherence */
                    bits_surround_coh =
encode_surround_coherence(bits_surround_coh, q_direction, coding_subbands,
no_directions, all_coherence_zero, metadata);
                }
                /* output number of bits */
                return nbits + bits_surround_coh;
            }
            else
            {
                return nbits;
            }
        }
}
static short encode_coherence_indexesDCT0(unsigned short* idx_dot, short len,
short* no_cb_vec, IVAS_MASA_METADATA_FRAME* metadata, int first_pos)
{
    short nbits =0;
    short i;
    int no_cb;
    unsigned short idx;
    /* calculate bits for dct0 components with joint encoding */
    no_cb = no_cb_vec[0];
    for (i = 1; i < len; i++)
    {
        no_cb *= no_cb_vec[i];
```

-continued

```
    }
    nbits = ceilf(logf((float)no__cb)*INV__LOG__2);
    /* create combined index */
    idx = create__combined__index(idx__dct, len, no__cb__vec);
    /* write combined index */
    first__pos = write__in__bit__buff(metadata->bit__buffer, idx, first__pos,
nbits);
    return nbits;
}
static short encode__coherence__indexesDCT1(unsigned short* idx__dct, short len,
short* no__cb__vec, IVAS__MASA__METADATA__FRAME* metadata)
{
    short nbits =0;
    short i;
    short GR__ord;
    short av;
    short data, bits__GR;
    unsigned short mr__idx__dct[MASA__MAXIMUM__CODING__SUBBANDS];
        GR__ord = 0;
        bits__GR = mean__removed__GR(idx__dct, len, 0, &GR__ord, &av, metadata,
mr__idx__dct);
        for (i = 0; i < len; i++)
        {
            data GR__data(mr__idx__dct[i], GR__ord, &bits__GR, 0);
            nbits += bits__GR;
            matadata->bit__pos = write__in__bit__buff(metadata->bit__buffer, data,
metadata->bit__pos, bits__GR);
        }
        nbits += len__huf[av];
        metadata->bit__pos = write__in__bit__buff(metadata->bit__buffer,
huff__code__av[av], metadata->bit__pos, len__huf[av]);
    return nbits;
}
static short mean__removed__GR(unsigned short* idx,
                    short len,
                    short adapt__GR,
                    short* GR__ord,
                    short* p__av,
                    IVAS__MASA__METADATA__FRAME* metadata,
                    unsigned short * mr__idx)
{
    short av, i, nbits;
    short sh__idx[5];
    av = (short)roundf(sum__s((short*) idx, len) / (float)len);
    *p__av = av;
    for (i = 0; i < len; i++)
    {
        sh__idx[i] = idx[i] − av;
    }
    for (i = 0; i < len; i++)
    {
        if (sh__idx[i] < 0)
        {
            sh__idx[i] = −2*sh__idx[i];
        }
        else if (sh__idx[i] > 0)
        {
            sh__idx[i] = sh__idx[i] * 2 − 1;
        }
        else
        {
            sh__idx[i] = 0;
        }
        mr__idz[i] = (unsigned short)sh__idx[i];
    }
    nbits = GR__bits(mr__idz, len, *GR__ord, adapt__GR, GR__ord);
    return nbits;
}
```

Figure 8:
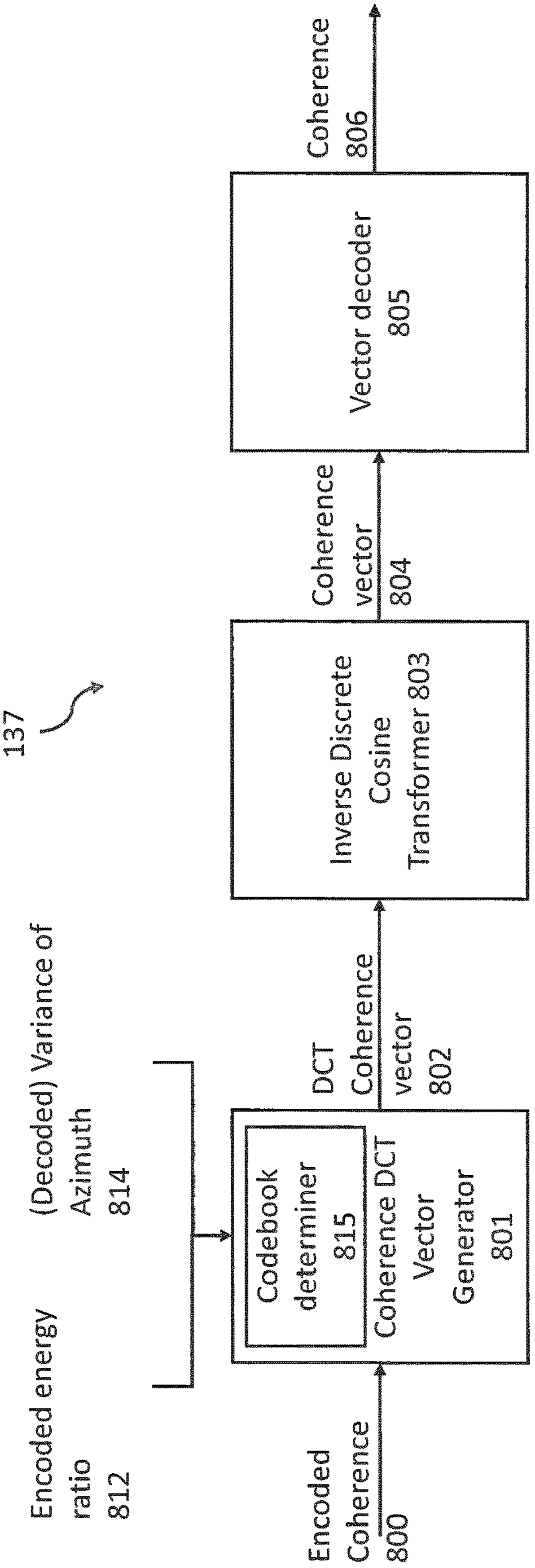
FIG. 8 shows schematically the metadata decoder with respect to coherence decoding according to some embodiments.

With respect to FIG. 8 is shown an example metadata extractor 137 as part of the decoder 133 from the viewpoint of the extraction and decoding of the coherence values according to some embodiments.

In some embodiments the encoded datastream is passed to a demultiplexer. The demultiplexer extracts the encoded direction indices, energy ratio indices and coherence indices and may also in some embodiments extract the other metadata and transport audio signals (not shown).

The energy ratio indices may be decoded by an energy ratio decoder to generate the energy ratios for the frame by performing the inverse of the encoding of the energy ratios implemented by the energy ratio encoder. Furthermore the energy ratio index may be passed to a coherence DCT vector generator (and in some embodiments to a codebook determiner 815).

The direction indices may be decoded by a direction decoder configured to perform the inverse of the encoding of the direction values implemented by the direction encoder. In some embodiments having decoded the direction values a variance of the Azimuth values is determined and output to the coherence DCT vector generator (and in some embodiments to a codebook determiner 815).

The metadata extractor 137 in some embodiments comprises a coherence DCT vector generator 801 (and in some embodiments to a codebook determiner 815). The coherence DCT vector generator 801 is configured to receive the encoded coherence values 800 and furthermore receive the encoded energy ratio 812 and the variance of the (decoded) azimuth values 814. Based on these values a codebook is selected or determined (for example the codebook determiner 815 may be the same as the codebook determiner 415 from the coherence encoder 209).

Having determined a codebook the received encoded coherence index is then decoded using the inverse of the encoding methods used in the coherence encoder to generate a suitable DCT coherence vector 802 for the spread coherence values and the surround coherence values. The DCT coherence vector 802 is then passed to an inverse discrete cosine transformer 803.

The metadata extractor 137 in some embodiments comprises an inverse discrete cosine transformer 803. The inverse discrete cosine transformer 803 is configured to receive the (decoded) DCT coherence vector 802 and generate a coherence vector 804 which is output to the vector decoder 805.

The metadata extractor 137 in some embodiments comprises a vector decoder 805. The vector decoder 805 is configured to receive the decoded coherence vector 804 and extract from this the coherence parameters 806 for the sub-band.

Figure 9:
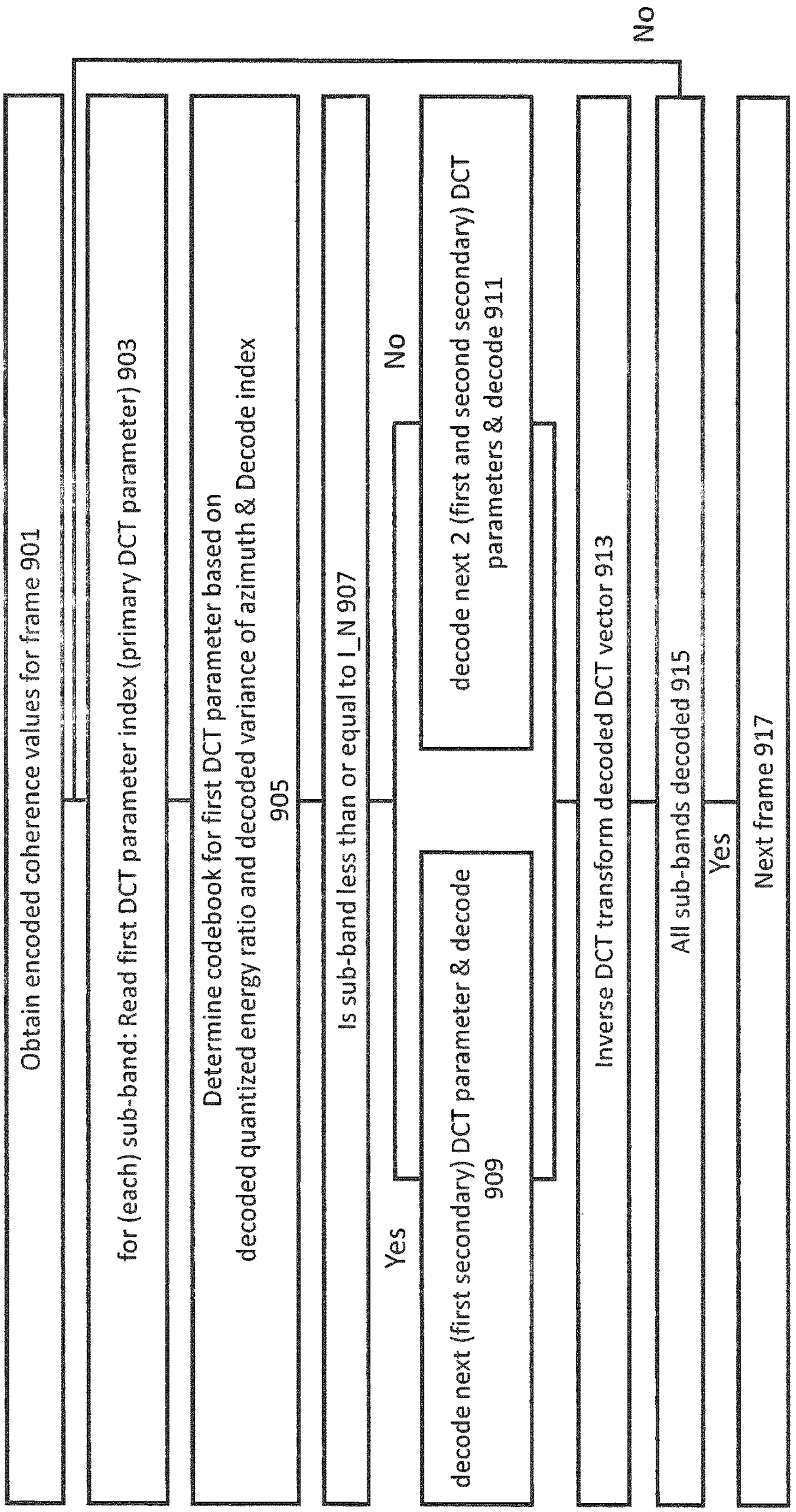
FIG. 9 show a flow diagram of the operation of a metadata decoder as shown in FIG. 8 according to some embodiments.

With respect to FIG. 9 is shown a flow diagram of the method for the decoding of the spread coherence parameters.

The first operation is obtaining (for example receiving or retrieving) encoded spread coherence values as shown in FIG. 9 by step 901.

Having obtained the encoded spread coherence values then the next operation is for (each) sub-band: Read a first DCT spread coherence parameter index (primary DCT parameter) as shown in FIG. 9 by step 903.

Although not shown in FIG. 9 as well as obtaining the encoded spread coherence values, the encoded surround coherence values, the encoded energy ratios and the encoded azimuth and elevation values are obtained.

The encoded energy ratios and the encoded azimuth and elevation value are decoded by applying the inverse of the encoding process performed in the encoder. The energy ratios are decoded first. The number of bits used for the spread coherence DCT indexes are known based on the energy ratio values. The indexes transmitted for encoding the zero order DCT parameters of the spread coherence are first read and can be decoded only after the decoding of the azimuth values.

Furthermore the encoded surround coherence value is decoded based on applying the inverse of the encoding process in the encoder. This for example involves selecting a suitable codebook based on the energy ratio value.

The next operation is determining a codebook for first DCT spread coherence parameter based on quantized energy ratio and decoded quantized variance of azimuth. Having determined the codebook the first DCT spread coherence parameter index is decoded as shown in FIG. 9 by step 905.

The next operation is determining whether the current sub-band being decoded is less than or equal to the sub-band value used in the encoder (I_N) as shown in FIG. 9 by step 907.

Where the current sub-band being decoded is less than or equal to the sub-band value used in the encoder (I_N) then the next (first secondary) DCT spread coherence parameter is read and decoded using the inverse of the encoding implemented in the encoder as shown in FIG. 9 by step 909.

Where the current sub-band being decoded is more than the sub-band value used in the encoder (I_N) then the next two (first and second secondary) DCT spread coherence parameters are read and decoded using the inverse of the encoding implemented in the encoder as shown in FIG. 9 by step 911.

Having decoded two (or three) DCT parameters the next operation is performing an Inverse DCT on the parameters to generate a decoded vector as shown in FIG. 9 by step 913.

The decoded vector can then be read as the time-frequency block spread coherence values for the sub-band. The next operation is checking whether all sub-bands have been decoded a shown in FIG. 9 by step 915.

When there is another sub-band to be decoded the operation may loop back to step 903.

When all the sub-bands are decoded then the next frame decoding may be started as shown in FIG. 9 by step 917 (in other words the operation loops back to step 901.

Figure 10:
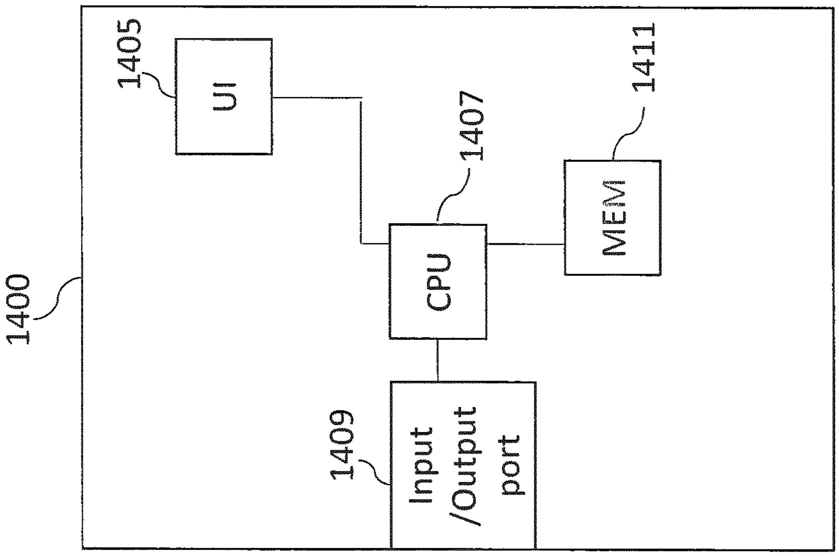
FIG. 10 shows schematically an example device suitable for implementing the apparatus shown.

With respect to FIG. 10 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for audio encoding comprising at least one processor and at least one memory including computer program code, the at least one memory and the computer program code configured to:

receive values for a sub-band of a frame of an audio signal, the values comprising a plurality of azimuth values, a plurality of elevation values, a plurality of energy ratio values and a plurality of spread and/or surround coherence values;

determine a codebook for encoding the plurality of spread and/or surround coherence values for the sub-band by the apparatus being configured to:

obtain an index representing an average value of the plurality of energy ratio values for a sub-band, determine whether the variance of the plurality of azimuth values for the sub-band is more than or equal to a threshold value, and select the codebook based on the index and whether the variance of the azimuth values for the sub-band is more than or equal to the threshold value;

discrete cosine transform at least one vector, the at least one vector comprising the plurality of spread and/or surround coherence values for the sub-band;

encode a number of components of the discrete cosine transformed vector based on the determined codebook; and store and/or transmit the encoded number of components of the discrete cosine transformed vector for use in reproduction of the audio signal by a multi-channel loudspeaker or headphones.

2. The apparatus as claimed in claim 1, wherein the apparatus configured to select the codebook based on the index and the determining whether the variance of the at least one azimuth value for the sub-band is more than or equal to the threshold value is further configured to select a number of codewords for a codebook based on the index.

3. The apparatus as claimed in claim 1, wherein the apparatus configured to encode a number of components of the discrete cosine transformed vector based on the determined codebook is further configured to:

determine the number of components of the discrete cosine transformed vector is dependent on the sub-band; and encode a first component of the number of the discrete cosine transformed vector components based on the codebook.

4. The apparatus as claimed in claim 3, wherein the apparatus configured to encode a number of components of the discrete cosine transformed vector based on the determined codebook is further configured to:

determine a further codebook for scalar quantizing based on an index of the sub-band, each codebook comprising a determined number of codewords;

generate at least one further index for the remainder of the components of the number of the discrete cosine transformed vector components based on the determined codebook;

generate a mean removed index based on the at least one further index for the remainder of the components of the number of the discrete cosine transformed vector components; and entropy encode the mean removed index.

5. The apparatus as claimed in claim 3, wherein the apparatus configured to encode a number of components of the discrete cosine transformed vector based on the determined codebook is further configured to:

determine at least one further index for the remainder of the components of the number of the discrete cosine transformed vector components based on a codebook with a defined number of codewords, the codebook being further based on a sub-band index of the vector;

determine a mean removed index based on the at least one further index for the remainder of the components of the number of the discrete cosine transformed vector components; and entropy encode the mean removed index.

6. The apparatus as claimed in claim 4, wherein the apparatus configured to entropy encode the mean removed index is further configured to Golomb-Rice encoding the mean removed index.

7. The apparatus as claimed in claim 1, wherein the apparatus is further configured to scalar quantize the at least one energy ratio value, to generate at least one energy ratio value index suitable for determining the codebook for encoding at least one coherence value for the sub-band.

8. The apparatus as claimed in claim 7, wherein the apparatus is further configured to:

estimate a number of bits remaining for encoding the plurality of azimuth values and the plurality of elevation values based on a target number of bits, an estimate of a number of bits for encoding the number of components of the discrete cosine transformed vector based on the determined codebook before the encoding, a number of bits representing the at least one energy ratio value index, and a number of bits representing the entropy encoding of the mean removed index; and encode the plurality of azimuth values and the plurality of elevation values to generate at least one azimuth value index and at least one elevation value index based on the number of bits remaining, wherein the determining the codebook for encoding at least one coherence value for the sub-band is based on the at least one azimuth value index.

9. An apparatus comprising at least one processor and at least one memory including computer program code, the at least one memory and the computer program code configured to:

obtain encoded values for a sub-band of a frame of an audio signal, the values comprising a plurality of azimuth indexes, a plurality of elevation indexes an energy ratio index and a spread and/or surround coherence index;

decode the plurality of azimuth indexes to give a plurality of azimuth values;

determine a codebook for decoding the spread and/or surround coherence index for the sub-band by the apparatus being configured to determine whether a variance of the plurality of azimuth values for the sub-band is more than or equal to a threshold value, and select the codebook based on the energy ratio index and whether the variance of the plurality of azimuth values for the sub-band is more than or equal to the threshold value;

inverse discrete cosine transform the spread and/or surround coherence index to generate a vector, the vector comprising the plurality of spread and/or surround coherence values for the sub-band; and parse the vector to generate the plurality of spread and/or surround coherence values for the sub-band for use in reproduction of the audio signal by a multi-channel loudspeaker or headphones.

10. The apparatus as claimed in claim 9, wherein the apparatus configured to select the codebook based on the energy ratio index and whether the variance of the at least one azimuth value for a sub-band for a frame is more than or equal to the threshold value is further configured to select a number of codewords for the codebook based on the energy ratio index.

11. The apparatus as claimed in claim 9, wherein the apparatus configured to decode a number of components of the discrete cosine transformed vector based on the determined codebook is configured to:

decode a first component of the number of the discrete cosine transformed vector components based on the codebook;

decode further components of the number of the discrete cosine transformed vector components based on the codebook; and inverse cosine transform the decoded first component and further components.

12. A method comprising:

receiving values for a sub-band of a frame of an audio signal, the values comprising a plurality of azimuth values, a plurality of elevation values, a plurality of energy ratio values and a plurality of spread and/or surround coherence values;

determining a codebook for encoding the plurality of spread and/or surround coherence values for the sub-band by:

obtaining an index representing an average value of the plurality of energy ratio values for a sub-band, determining whether the variance of the plurality of azimuth values for the sub-band is more than or equal to a threshold value, and selecting the codebook based on the index and whether the variance of the azimuth values for the sub-band is more than or equal to the threshold value;

discrete cosine transforming at least one vector, the at least one vector comprising the plurality of spread and/or surround coherence values for the sub-band;

encoding a number of components of the discrete cosine transformed vector based on the determined codebook; and storing and/or transmitting the encoded number of components of the discrete cosine transformed vector for use in reproduction of the audio signal by a multi-channel loudspeaker or headphones.

13. The method as claimed in claim 12, wherein selecting the codebook based on the index and the determining whether the variance of the at least one azimuth values for the sub-band is more than or equal to the threshold value further comprises selecting a number of codewords for a codebook based on the index.

14. A method comprising:

obtaining encoded values for a sub-band of a frame of an audio signal, the values comprising a plurality of azimuth indexes, a plurality of elevation indexes, an energy ratio index, and a spread and/or surround coherence index;

decoding the plurality of azimuth indexes to give a plurality of azimuth values;

determining a codebook for decoding the spread and/or surround coherence index for the sub-band by: determining whether a variance of the plurality of azimuth values for the sub-band is more than or equal to a threshold value, and selecting the codebook based on the energy ratio index and whether the variance of the plurality of azimuth values for the sub-band is more than or equal to a threshold value;

inverse discrete cosine transforming the spread and/or surround coherence index to generate vector, the vector comprising the plurality of spread and/or surround coherence values for the sub-band; and parsing the vector to generate the plurality of spread and/or surround coherence values for the sub-band for use in reproduction of the audio signal by a multi-channel loudspeaker or headphones.

* * * * *